United States Patent
Fujii et al.

(10) Patent No.: US 8,092,197 B2
(45) Date of Patent: Jan. 10, 2012

(54) HYDRAULIC SYSTEM

(75) Inventors: Toshiro Fujii, Kariya (JP); Kazuho Yamada, Kariya (JP); Yoshiyuki Nakane, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 564 days.

(21) Appl. No.: 12/357,679

(22) Filed: Jan. 22, 2009

(65) Prior Publication Data

US 2009/0202370 A1    Aug. 13, 2009

(30) Foreign Application Priority Data

Feb. 12, 2008    (JP) ................................. 2008-030117

(51) Int. Cl.
*F04B 17/03*    (2006.01)

(52) U.S. Cl. .................. 417/411; 417/410.1; 429/416; 429/414; 429/423; 429/428

(58) Field of Classification Search .................. 417/411, 417/410.1, 319; 429/416, 414, 428, 423, 429/12, 19; 464/160, 112; 310/261.1, 90, 310/100, 114, 75 D, 211
See application file for complete search history.

(56) References Cited

FOREIGN PATENT DOCUMENTS

| JP | 60-158559 A | 8/1985 |
|----|-------------|--------|
| JP | 2000-333364 A | 11/2000 |
| JP | 2007-230464 A | 9/2007 |

*Primary Examiner* — Karabi Guharay
*Assistant Examiner* — Elmito Breval
(74) *Attorney, Agent, or Firm* — Knoble Yoshida & Dunleavy, LLC

(57) ABSTRACT

A hydraulic system that can implement effective practical use of energy is provided. A hydraulic system according to the present invention has a hydraulic pump driven by a hydraulic pump motor, a loading cylinder and a power steering cylinder which are driven by pressure oil supplied from the hydraulic pump, and power supply means for supplying power to the hydraulic pump motor. The power supply means comprises a stack of a fuel cell, a fuel supply passage for supplying hydrogen gas to the stack, fuel circulating passages in which a hydrogen pump for joining unreacted hydrogen gas discharged from the stack into the fuel supply passage to circulate hydrogen gas is disposed, and a regenerator which is driven by pressure oil to generate rotational force. The hydrogen pump is rotationally driven by the regenerator.

9 Claims, 3 Drawing Sheets

HYDRAULIC SYSTEM

CROSS-REFERENCE TO RELATED APPLICATION

This application claims the benefit of priority to Japanese Patent Application No. 2008-30117, filed on Feb. 12, 2008, the contents of which are hereby incorporated herein by reference.

BACKGROUND OF THE INVENTION

The present invention relates to a hydraulic system.

A conventional hydraulic system is disclosed in JP-A-2000-333364. This hydraulic system is comprising a hydraulic pump driven by a hydraulic pump motor, a hydraulic actuator driven by pressure oil supplied from the hydraulic pump and power supply means. The power supply means has a battery and a stack of a fuel cell supplied with fuel gas and oxidant gas to generate electric power so that power is supplied to the hydraulic pump motor.

In this hydraulic system, the hydraulic pump motor can be driven by the battery and stack. Therefore, even when power of the battery runs short, the hydraulic pump motor can be driven by the stack, and the hydraulic actuator can be driven by the hydraulic pump. Furthermore, the battery can be prevented from falling into over-discharge, so that decrease in the lifetime of the battery can be prevented, and also this hydraulic system has an excellent effect from the viewpoint of noise and environment.

However, in the conventional hydraulic system, the pressure oil supplied from the hydraulic pump is supplied only to drive the hydraulic actuator, and energy is wastefully consumed.

BRIEF SUMMARY OF THE INVENTION

The present invention has been implemented in view of the above situation, and has an object to provide a hydraulic system that can implement effective utilization of energy.

A hydraulic system is comprising a hydraulic pump driven by a hydraulic pump motor, a hydraulic actuator driven by pressure oil supplied from the hydraulic pump and power supply means for supplying power to the hydraulic pump motor. The hydraulic system is characterized in that the power supply means comprises a stack of a fuel cell which is supplied with fuel gas and oxidant gas to generate electric power, a fuel supply passage having supplying the fuel gas to the stack, a fuel circulating passage having a fuel pump disposed therein, the fuel pump making unreacted fuel gas discharged from the stack flow into the fuel supply passage to circulate the fuel gas, and a regenerator driven by the pressure oil to generate rotational force. The fuel pump is rotationally driven by the regenerator.

In the hydraulic system of the present invention, the hydraulic pump motor is driven by the power supplied from the power supply means, and the hydraulic pump is driven by the hydraulic pump motor. The hydraulic actuator and the regenerator are driven by kinetic energy of the pressure oil supplied from the hydraulic pump, and the fuel pump is rotationally driven by the regenerator. At this time, since the pressure oil is uncompressible fluid, the pressure oil is not set to a compressed state when the regenerator is driven, and thus the regenerator can be driven by sufficient rotational force.

In this hydraulic system, unreacted fuel gas discharged from the stack can be re-circulated through the fuel circulating passage, so that the fuel gas is prevented from being wastefully consumed and thus the efficiency can be enhanced.

Accordingly, this hydraulic system can implement effective utilization of energy. Furthermore, the fuel pump can be stably driven by sufficient rotational force, so that the fuel pump motor for driving the fuel pump can be omitted or miniaturized.

Furthermore, the hydraulic system has the following advantages as compared with a general hydraulic system using a fuel cell system for rotating the fuel pump by the fuel pump motor.

(1) Even when the fuel pump is rotationally driven by only the regenerator, the regenerator which can implement the required torque is smaller than the fuel pump motor. That is, the work W of the regenerator is equal to a product of the pressure P and the volume V (W=PV), and the volume V can be reduced as the pressure P is larger. The pressure oil is equal to high pressure from 1 M to 20 MPa. Therefore, the miniaturization and the reduction in weight of the hydraulic system can be implemented.

As compared with a case where a fuel cell system in which a regenerator is driven by air supplied from an air compressor is used, discharge gauge pressure of air is equal to about 200 kPa, and thus pressure of about 5 to 100 times can be used.

(2) It is difficult to heat fuel gas. That is, the temperature of the fuel pump motor is increased to about 150° C. It is preferable that the stack is cooled to about 80° C., and the unreacted fuel gas discharged from the stack is equal to the same temperature. When the unreacted fuel gas discharged from the stack is heated by the fuel pump motor, the flow amount of cooling water would be increased to lower the temperature of the stack, and thus power loss occurs. Furthermore, when the fuel pump motor is provided with a cooling system for lowering the temperature of the fuel pump motor, power loss also occurs, and also a space problem containing pipes, etc. also occurs. When the fuel pump is rotationally driven by the regenerator, the power loss can be reduced, and also the space problem can be relaxed.

(3) The degree of freedom of selecting the materials of pipes through which the fuel gas flows is enhanced. That is, the temperature of the fuel gas hardly increases, so that pipes formed of materials having low heat resistance such as resin pipes can be also selected.

(4) Hydrogen gas which is frequently adopted as the fuel gas has a small molecular weight, and it is liable to leak from seals provided to the connection portions of the pipes, etc. However, since no electricity is used to rotationally drive the fuel pump, it is safe and the insulation can be lowered.

(5) In general, the stack has a potential of 450V, and the fuel pump motor which rotationally drive the fuel pump is driven with about 200V. When the fuel pump is rotationally driven by the regenerator, the fuel pump can be avoided from being corroded due to the potential difference. Furthermore, when the fuel pump is rotationally driven by the regenerator, occurrence of radio noise due to the potential difference can be prevented, and thus the necessity of keeping high insulation between the stack and the fuel pump is lowered.

(6) The regenerator is connected to the hydraulic pump by pressure oil as incompressible fluid, and thus the regenerator promptly responds to the control of the hydraulic pump.

(7) The recirculation flow rate of the fuel gas is determined by the output of the hydraulic pump, however, the amount of pressure oil can be easily controlled in conformity with variation of required output, and thus the control device can be facilitated.

Other aspects and advantages of the invention will be apparent from embodiments disclosed in the attached drawings, illustrations exemplified therein, and the concept of the invention.

BRIEF DESCRIPTION OF THE SEVERAL VIEWS OF THE DRAWINGS

The invention will be described in more detail along with the concept and advantages thereof by referring to the attached drawings and the detailed description of the preferred embodiments below.

DETAILED DESCRIPTION OF THE PREFERRED EMBODIMENTS

Embodiments 1 to 3 embodying the present invention will be described with reference to the drawings.

Embodiment 1

Figure 1:
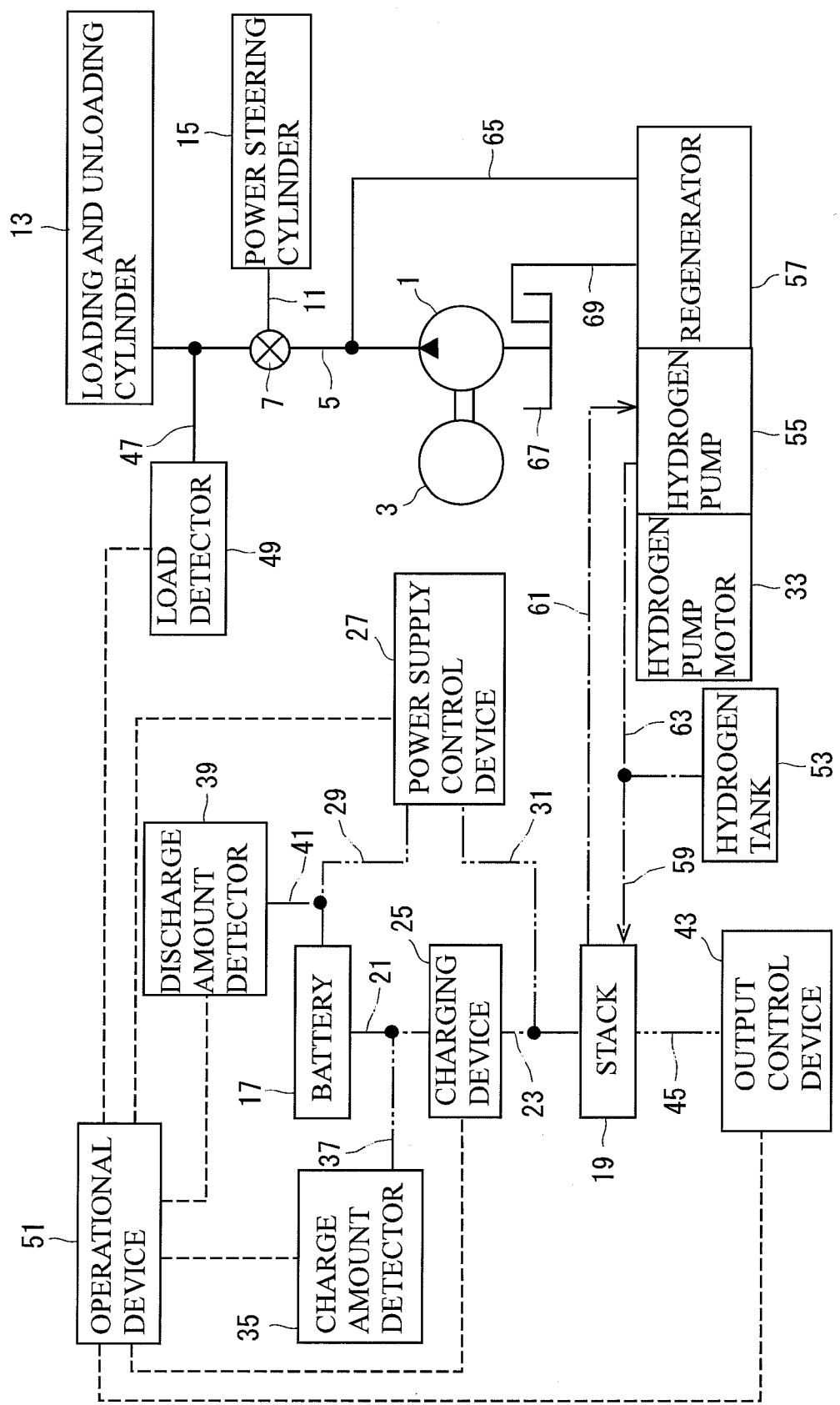
FIG. 1 is a schematic diagram showing the construction of a hydraulic system according to an embodiment 1.

A hydraulic system of an embodiment 1 is used in a fork lift. As shown in FIG. 1, the hydraulic system is designed so that a hydraulic pump 1 is driven by a hydraulic pump motor 3, and a main oil supply passage 5 extending to a loading cylinder 13 is connected to the hydraulic pump 1. The loading cylinder includes a lift cylinder and a tilt cylinder. An auxiliary oil supply passage 11 is connected to the main oil supply passage 5 through a priority valve 7. A power steering cylinder 15 is connected to the auxiliary oil supply passage 11. The loading cylinder 13 is used in a lift device of the fork lift, and the power steering cylinder 15 is used in a power steering device of the fork lift. The loading cylinder 13 and the power steering cylinder 15 serve as hydraulic actuators.

The hydraulic system has a battery 17 as a power supply device and a stack 19 of a fuel cell. The battery 17 and the stack 19 are connected to a charging device 25 through connection lines 21 and 23. The charging device 25 is used to charge the battery 17 with power generated by the stack 19. The battery 17 and the connection line 23 are connected to a power supply control device 27 through connection lines 29 and 31. The hydraulic pump motor 3, a hydrogen pump motor 33 as a regenerating motor described later are connected to the battery 17 and the stack 19 through connection lines (not shown), and the power controlled by the power supply control device 27 is supplied from the battery 17 or the stack 19.

A charge amount detector 35 is connected to the connection line 21 through a connection line 37, and a discharge amount detector 39 is connected to the connection line 29 through a connection line 41. An output control device 43 is connected to the stack 19 through a connection line 45. A load detector 49 is connected to the main oil supply passage 5 between the priority valve 7 and the loading cylinder 13 by a detector 47. The power supply control device 27, the charging device 25, the charge amount detector 35, the discharge amount detector 39, the output control device 43 and the load detector 49 are connected to an operational device 51 so that communications can be performed between each unit and the operational device 51.

Furthermore, the hydraulic system has a hydrogen tank 53 as a fuel tank, the hydrogen pump motor 33, a hydrogen pump 55 and a regenerator 57. The stack 19 is supplied with air in the atmosphere while the air is compressed by an air compressor (not shown).

The hydrogen tank 53 stocks hydrogen gas under high pressure. The stack 19 and the hydrogen tank 53 are connected to each other through a fuel supply passage 59, and a fuel discharge passage 61 is connected to the downstream side of the stack 19.

The hydrogen pump motor 33, the hydrogen pump 55 and the regenerator 57 are integrally fixed to one another. The hydrogen pump 55 is used to circulate unreacted hydrogen gas discharged from the stack 19. The driving shaft of the hydrogen pup 55 is joined to the rotational shaft of the hydrogen pump motor 33 in a tandem style. The fuel discharge passage 61 is connected to the suction port of the hydrogen pump 55, and a fuel circulating and discharging passage 63 which is joined to the fuel supply passage 59 is connected to the discharge port of the hydrogen pump 55. The fuel discharge passage 61 and the fuel circulating and discharging passage 63 correspond to a fuel circulating passage.

The regenerator 57 is a hydraulic (liquid pressure) motor, and it is designed so that the turbine thereof is rotated by pressure oil. The turbine of the regenerator 57 is joined to the driving shaft of the hydrogen pump 55 in a tandem style. A regenerative oil supply passage 65 which is branched from the main oil supply passage 5 is connected to the suction port of the regenerator 57, and a regenerative drain passage 69 connected to a drain 67 is connected to the discharge port of the regenerator 57.

The battery 17, the stack 19, the charging device 25, the power supply control device 27, the charging amount detector 35, the discharge amount detector 39, the output control device 43, the load detector 49, the operational device 51, the hydrogen tank 53, the hydrogen pump motor 33, the hydrogen pump 55, the regenerator 57, the connection lines 21, etc. for connecting the above units, the fuel supply passage 59, the fuel discharge passage 61, the fuel circulating and discharging passage 63, the regenerative oil supply passage 65, the regenerative drain passage 69, etc. correspond to power supply means.

In this hydraulic system, the hydraulic pump motor 3 is driven by power supplied from the battery 17 or the stack 19 through the power supply control device 27, and the hydraulic pump 1 is driven by the hydraulic pump motor 3. The kinetic energy of the pressure oil supplied from the hydraulic pump 1 drives the regenerator 57 together with the loading cylinder 13 and the power steering cylinder 15, and the hydrogen pump 55 is rotated by the regenerator 57. At this time, the pressure oil is fluid which cannot be compressed, and thus the pressure oil is prevented from falling into a compressed state at the driving time of the regenerator 57, so that the regenerator 57 can be driven with sufficient rotational force.

Furthermore, in the hydraulic system, unreacted hydrogen gas discharged from the stack 19 can be re-circulated into the stack 19 through the fuel discharge passage 61 and the fuel circulating and discharging passage 63, so that hydrogen gas can be prevented from being needlessly consumed and the efficiency can be enhanced.

The hydrogen tank 53 is disposed in the fuel supply passage 59, and when the regenerator 57 does not rotate the hydrogen pump 55 by means of the power supply control device 27, hydrogen gas in the hydrogen tank 53 is supplied to the stack 19. Therefore, for example when the loading cylinder 13 and the power steering cylinder 15 are under non-operation, the stack 19 can generate electric power while power consumption is suppressed by stopping the hydraulic pump motor 3.

Accordingly, the hydraulic system can implement more effective practical use of energy. Furthermore, the hydrogen pump 55 can be stably driven with sufficient rotational force, so that the hydrogen pump motor 33 for driving the hydrogen pump 55 can be miniaturized and excellent mount performance in a vehicle or the like can be implemented. Furthermore, the hydraulic system has the above advantage as compare with a hydraulic system using a general fuel cell system for rotating a hydrogen pump 55 just by a motor.

Furthermore, in the hydraulic system, pressure oil can be preferentially supplied to the loading cylinder 13 or the power steering cylinder 15 by the priority valve 7. Pressure oil can be simultaneously supplied to the loading cylinder 13 or the power steering cylinder 15 and the regenerator 57, and the stack 19 can be made to generate electric power by driving the hydraulic pump motor 3 during a period for which power is required.

As described above, the hydraulic system can drive the hydraulic pump motor 3 by the battery 17 or the stack 19. Even when the power of the battery 17 is insufficient, the hydraulic pump motor 3 can be driven by the stack 19, and the loading cylinder 13 and the power steering cylinder 15 can be driven by the hydraulic pump 1. When the power of the battery 17 is insufficient, under the non-operation of the loading cylinder 13 and the power steering cylinder 15, the regenerator 57 is driven to drive the hydrogen pump 55, and the power generation of the stack 19 is carried out, whereby the battery 17 can be charged. As described above, the battery 17 can be prevented from being over-discharged and thus the reduction of the lifetime of the battery 17 can be prevented. Furthermore, an excellent effect can be obtained with respect to the noise and the environment.

In the hydraulic system, the hydrogen pump 55 and the regenerator 57 are constructed integrally with each other. Therefore, the construction can be simplified and the manufacturing cost can be reduced.

Still furthermore, in the hydraulic system, the hydrogen pump motor 33 is connected to the regenerator 57. Therefore, in a case where the viscosity resistance of the pressure oil at low temperature is large, if it is difficult to drive the hydrogen pump 55 by the regenerator 57, the regenerator 57 could be assisted by the hydrogen pump motor 33.

In the hydraulic system, the electromagnetic clutch is provided between the rotational shaft of the hydrogen pump motor 33 and the turbine of the regenerator 57 or between the turbine of the regenerator 57 and the driving shaft of the hydrogen pump 55, whereby the hydrogen pump 55 can be driven together with or independently of the regenerator 57. Since, the hydrogen pump motor 33 is not driven at all times, demerit that is caused by the continuous driving of the hydrogen pump motor 33 does not occur.

Furthermore, in the hydraulic system, the hydrogen pump motor 33 may be omitted, whereby the hydraulic system can be further miniaturized.

Embodiment 2

Figure 2:
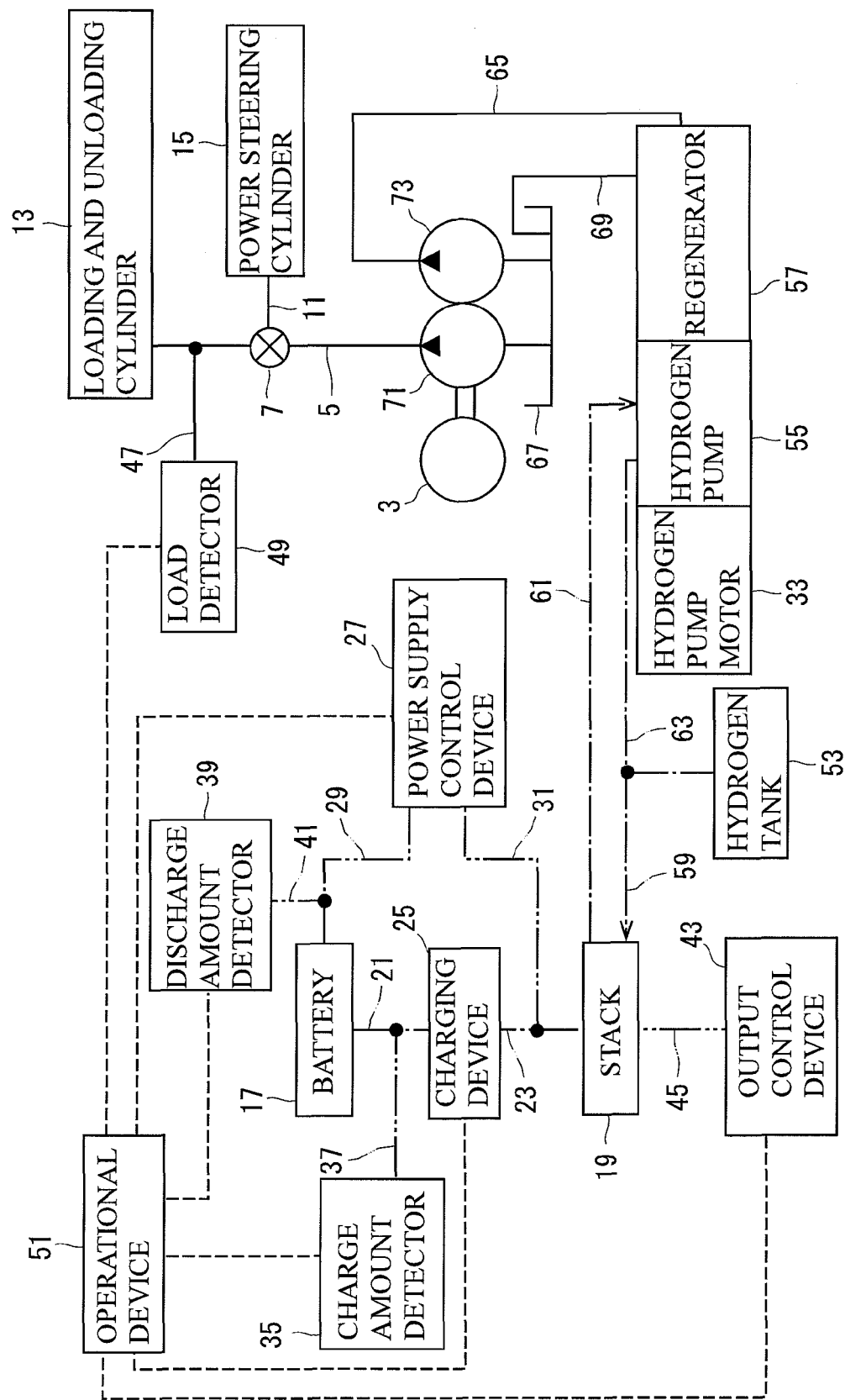
FIG. 2 is a schematic diagram showing the construction of a hydraulic system according to an embodiment 2.

As shown in FIG. 2, in a hydraulic system according to an embodiment 2, a main hydraulic pump 71 and an auxiliary hydraulic pump 73 are joined to each other in a tandem style, and the main hydraulic pump 71 and the auxiliary hydraulic pump 73 are driven by the hydraulic pump motor 3. The main oil supply passage 5 is connected to the main hydraulic pump 71, and a regenerative oil supply passage 65 is connected to the auxiliary hydraulic pump 73. The other construction is the same as the hydraulic system of the embodiment 1.

In the hydraulic system, the main hydraulic pump 71 and the auxiliary hydraulic pump 73 can be simultaneously driven by the hydraulic pump motor 3. The pressure oil supplied from the main hydraulic pump 71 is preferentially supplied to the loading cylinder 13 or the power steering cylinder 15 by the priority valve 7. Furthermore, the pressure oil supplied by the auxiliary hydraulic pump 73 is supplied to the regenerator 57. Therefore, the hydraulic pump motor 3 is driven, and electric power can be generated by the stack 19 during a power-required period. The other action and effect are the same as the embodiment 1.

Embodiment 3

Figure 3:
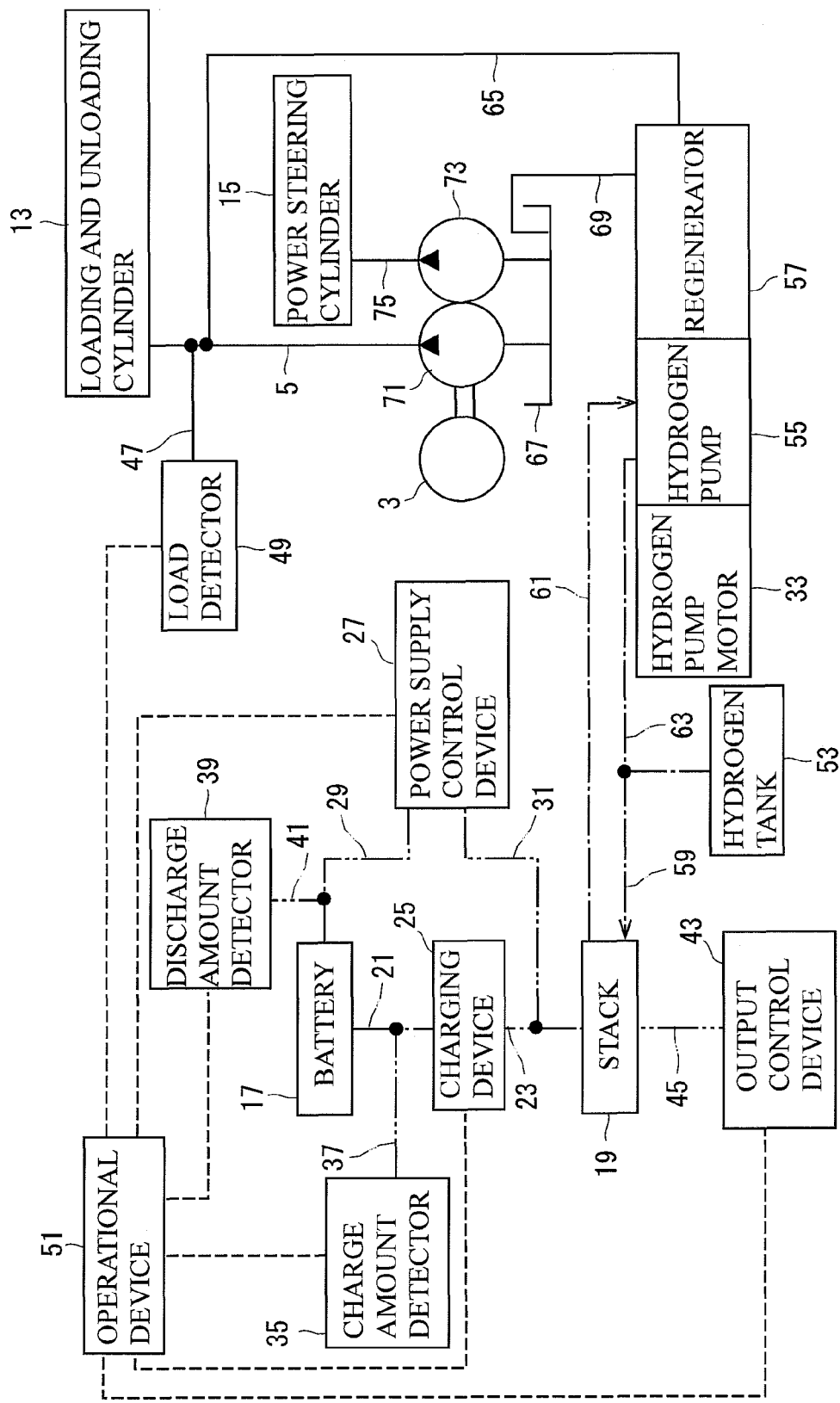
FIG. 3 is a schematic diagram showing the construction of a hydraulic system according to an embodiment 3.

As shown in FIG. 3, in a hydraulic system of an embodiment 3, the main hydraulic pump 71 and the loading cylinder 13 are connected to each other through the main oil supply passage 5, and the auxiliary hydraulic pump 73 and the power steering cylinder 15 are connected to each other through the auxiliary oil supply passage 75. Furthermore, the main hydraulic pump 71 and the regenerator 57 are connected to each other through the regenerative oil supply passage 65 branched from the main oil supply passage 5. The other construction is the same as the hydraulic system of the embodiment 2.

In the hydraulic system, the pressure oil supplied by the main hydraulic pump 71 is supplied to the loading cylinder 13. The pressure oil supplied by the auxiliary hydraulic pump 73 is supplied to the power steering cylinder 15, whereby the pressure oil can be stably supplied to the loading cylinder and the power steering cylinder 15. The pressure oil from the main hydraulic pump 71 is supplied through the main oil supply passage 5 and the regenerative oil supply passage 65 to the regenerator 57. Therefore, in the hydraulic system, the hydraulic pump motor 3 is driven, and electric power can be generated by the stack 19 during a power-required period. The other action and effect are the same as the embodiment 2.

In the hydraulic system of the embodiment 3, the regenerator 57 may be connected through the regenerative oil supply passage branched from the auxiliary oil supply passage 75.

The present invention has been described above along the embodiments 1 to 3. However, the present invention is not limited to the above embodiments 1 to 3, and various modifications and alterations may be properly made without departing from the subject matter of the present invention.

For example, the regenerator is a so-called hydraulic (liquid pressure) motor, and any type of motor may be adopted insofar as it can be normally adopted as a hydraulic motor.

In the hydraulic system of the present invention, it is preferable that the power supply means has a power supply device for supplying power to the hydraulic pump motor.

In this case, it is possible to drive the hydraulic pump motor by the power supply device and the stack. Therefore, when a battery or a capacitor is used as a power supply device, it is possible to drive the hydraulic pump motor by the stack and drive the hydraulic actuator by the hydraulic pump even in a case where power of the battery or the like runs short. Furthermore, when the power of the battery or the like runs short, it is possible to drive the fuel pump by driving the regenerator and perform power generation of the stack, so that the battery or the like can be charged. As described above, over-discharge of the battery or the like can be prevented, whereby the lifetime of the battery or the like can be prevented from being lowered. Furthermore, the hydraulic system of this invention has an excellent effect from the viewpoint of noise and environment. In addition to the battery and the capacitor, an external power source such as home electrical power may be adopted as the power supply device.

In the hydraulic system of the present invention, the hydraulic actuator may be a cylinder for loading or a cylinder for power steering. In this case, the effect of the present invention can be obtained in an industrial vehicle such as a fork lift or the like.

When the hydraulic actuator is a cylinder for loading and a cylinder for power steering, the hydraulic pump and the loading cylinder are connected to each other by a main oil supply passage in which a priority valve is disposed, the hydraulic pump and the power steering cylinder are connected to each other through the priority valve by an auxiliary oil supply passage connected to the priority valve, and the hydraulic pump and the regenerator are connected to each other by a regenerative oil supply passage which is branched from the main oil supply passage and at the upper stream side of the priority valve.

In this case, the pressure oil can be preferentially supplied to the loading cylinder and the power steering cylinder by the priority valve. Furthermore, the pressure oil can simultaneously supplied to the loading cylinder or the power steering cylinder and the regenerator, and the hydraulic pump motor is driven and the power generation is carried out by the stack while power is required.

Furthermore, when the hydraulic actuator is the loading cylinder and the power steering cylinder, the hydraulic pump driven by the hydraulic pump motor comprises a main hydraulic pump and an auxiliary hydraulic pump that is joined to the main hydraulic pump in a tandem style. The main hydraulic pump and the loading cylinder are connected to each other by the main oil supply passage in which the priority valve is disposed, and the main hydraulic pump and the power steering cylinder are connected to each other by the auxiliary oil supply passage connected to the priority valve. The auxiliary hydraulic pump and the regenerator can be connected to each other through the regenerative oil supply passage.

In this case, the main hydraulic pump and the auxiliary hydraulic pump can be driven by the hydraulic pump motor simultaneously. The pressure oil supplied by the main hydraulic pump is preferentially supplied to the loading cylinder or the power steering cylinder by the priority valve. The pressure oil supplied by the auxiliary pressure pump is supplied to the regenerator. Therefore, the hydraulic pump motor is driven, and the power generation is carried out by the stack while power is required.

Furthermore, when the hydraulic actuator is the loading cylinder or the power steering cylinder, the hydraulic pump driven by the hydraulic pump motor comprises a main hydraulic pump and an auxiliary hydraulic pump that is joined to the main hydraulic pump in a tandem style. The main hydraulic pump and the loading cylinder are connected to each other through the main oil supply passage, and the auxiliary hydraulic pump and the power steering cylinder are connected to each other through an auxiliary oil supply passage. The main hydraulic pump or the auxiliary hydraulic pump and the regenerator are connected to each other through a regenerative oil supply passage branched from the main oil supply passage or the auxiliary oil supply passage.

In this case, the main hydraulic pump and the auxiliary hydraulic pump can be simultaneously driven by the hydraulic pump motor. The pressure oil supplied by the main hydraulic pump is supplied to the loading cylinder. The pressure oil supplied by the auxiliary hydraulic pump is supplied to the power steering cylinder. Accordingly, the pressure oil can be stably supplied to the loading cylinder and the power steering cylinder. The pressure oil passed from the main hydraulic pump through the main oil supply passage or the pressure oil passed from the auxiliary hydraulic pump through the auxiliary oil supply passage is supplied through the regenerative oil supply passage to the regenerator. Therefore, the hydraulic pump motor is driven, and power generation can be carried out by the stack while power is required.

In the hydraulic system of the present invention, it is preferable that a fuel tank in which high-pressure fuel gas is stocked is disposed in the fuel supply passage, and fuel gas in the fuel tank is supplied to the stack when the regenerator does not rotationally drive the fuel pump.

In this case, when the hydraulic actuator is under no operation, the hydraulic pump motor is stopped, and power generation can be carried out by the stack with suppressing power consumption.

In the hydraulic system of the present invention, it is preferable that the fuel pump and the regenerator are constructed integrally with each other. In this case, the construction of the hydraulic system can be simplified, and the manufacturing cost can be reduced.

A regenerating motor may be connected to the regenerator. When it is difficult to drive the fuel pump by the regenerator under the state that the viscosity resistance of the pressure oil is large at low temperature, the regenerator can be assisted by the regenerating motor.

EXPLANATION OF INDUSTRIAL APPLICATION OF INVENTION

The present invention is usable in a power unit such as an industrial vehicle or the like.

The invention claimed is:
1. A hydraulic system comprising:
a hydraulic pump driven by a hydraulic pump motor;
a hydraulic actuator driven by pressure oil supplied from the hydraulic pump; and
power supply means for supplying power to the hydraulic pump motor, characterized in that
the power supply means comprises:
a stack of a fuel cell which is supplied with fuel gas and oxidant gas to generate electric power;
a fuel supply passage for supplying the fuel gas to the stack,
a fuel circulating passage containing therein a fuel pump for making the unreacted fuel gas discharged from the stack join to the fuel supply passage to circulate the fuel gas, and
a regenerator that is driven by the pressure oil to generate rotational force,
the fuel pump being rotated by the regenerator.
2. The hydraulic system according to claim 1, wherein the power supply means has a power supply device for supplying power to the hydraulic pump motor.
3. The hydraulic system according to claim 1, wherein the hydraulic actuator is a loading cylinder or a power steering cylinder.
4. The hydraulic system according to claim 1, wherein the hydraulic actuator is a loading cylinder and a power steering cylinder,
the hydraulic pump and the loading cylinder are connected to each other through a main oil supply passage in which a priority valve is disposed,
the hydraulic pump and the power steering cylinder are connected to each other through the priority valve by an auxiliary oil supply passage connected to the priority valve, and the hydraulic pump and the regenerator are connected to each other by a regenerative oil supply passage branched from the main oil supply passage at the upstream side of the priority valve.

5. The hydraulic system according to claim 1, wherein the hydraulic actuator is a loading cylinder and a power steering cylinder, the hydraulic pump driven by the hydraulic pump motor comprises a main hydraulic pump and an auxiliary hydraulic pump that is joined to the main hydraulic pump in a tandem style, the main hydraulic pump and the loading cylinder are connected to each other through a main oil supply passage in which a priority valve is disposed, the main hydraulic pump and the power steering cylinder are connected to each other by an auxiliary oil supply passage connected to the priority valve, and the auxiliary hydraulic pump and the regenerator are connected to each other through a regenerative oil supply passage.

6. The hydraulic system according to claim 1, wherein the hydraulic actuator comprise a loading cylinder and a power steering cylinder, the hydraulic pump driven by the hydraulic pump motor comprises a main hydraulic pump and an auxiliary hydraulic pump that is joined to the main hydraulic pump in a tandem style, the main hydraulic pump and the loading cylinder are connected to each other through a main oil supply passage, the auxiliary hydraulic pump and the power steering cylinder are connected to each other through an auxiliary oil supply passage, and the main hydraulic pump or the auxiliary hydraulic pump and the regenerator are connected to each other through a regenerative oil supply passage branched from the main oil supply passage or the auxiliary oil supply passage.

7. The hydraulic system according to any one of claim 1, wherein the fuel supply passage contains a fuel tank for stocking the fuel gas under high pressure, and the fuel gas in the fuel tank is supplied to the stack when the regenerator does not rotationally drive the fuel pump.

8. The hydraulic system according to any one of claim 1, wherein the fuel pump and the regenerator are constructed integrally with each other.

9. The hydraulic system according to any one of claim 1, wherein a regeneration motor is connected to the regenerator.

* * * * *